United States Patent Office 2,722,451
Patented Nov. 1, 1955

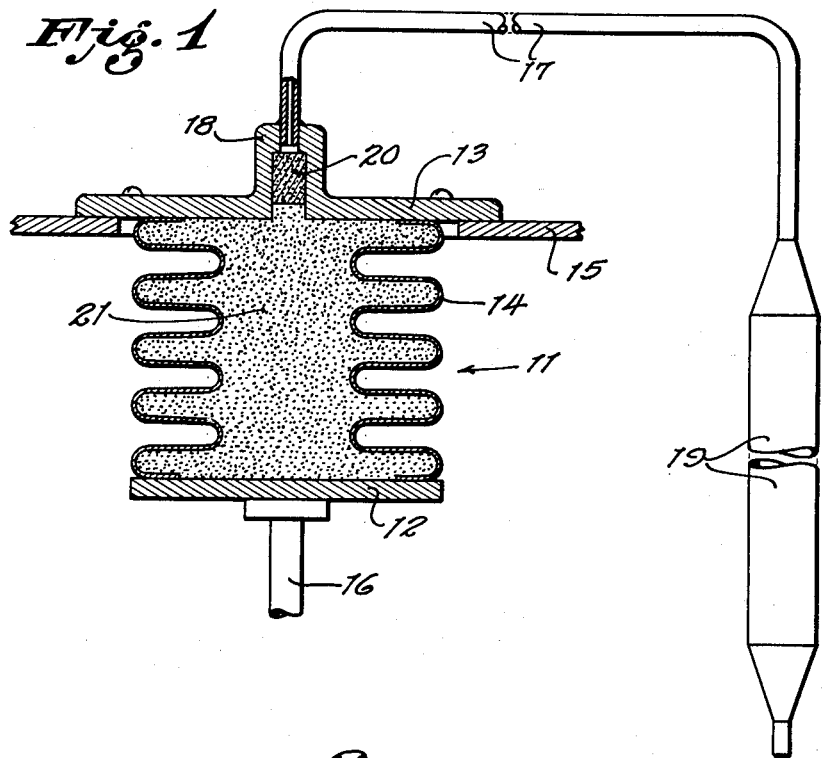
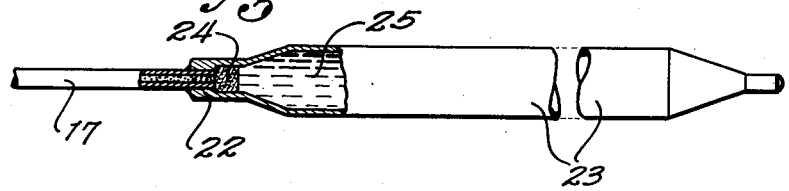

2,722,451

THERMOSTATIC CONTROL SYSTEM

Keith E. Wilson, Burbank, Calif., assignor to General Controls Co., Glendale, Calif., a corporation of California Application November 17, 1952, Serial No. 320,877

4 Claims. (Cl. 297—8)

This invention relates to thermostatic control systems of the type which comprise means forming a work chamber having a wall mounted by such as a bellows or diaphragm so that it can move in response to variation of pressure in the chamber; a thermal bulb, adapted to be subjected to the controlling temperature, connected to the work chamber so as to form therewith a closed system; and a charge or fill of thermally expansive fluid in the closed system.

In a system of the character described, the means defining the work chamber is normally located so that it is subjected to an ambient temperature which may be widely different from the controlling temperature at the thermal bulb so that the influence of the ambient temperature on the thermally expansive fluid in the chamber may be such as to materially impair the effectiveness of the system. Of even more importance is the fact that the control setting of the system is changed as the ambient temperature varies.

It is a main object of this invention to minimize the detrimental effect of the ambient temperature at the work chamber, and I accomplish this object by introducing into that chamber a substantial amount of solid matter having a low or negligible coefficient of thermal expansion, such as silica, so that the amount of thermally expansive fluid in the work chamber is reduced and the effect of the ambient temperature is proportionately less.

Another object of the invention is to provide the solid matter in the form of particles so fine that they can flow freely in narrow spaces such as the spaces between the convolutions of a bellows; filter means then being provided for preventing access of the particles to the interior of the thermal bulb.

For full understanding of the invention, and further appreciation of its features and advantages, reference is to be had to the following detailed description and accompanying drawing, and to the appended claims.

In the drawing:

Figure 1 is a sectional view of a thermostatic control system embodying my invention; and Figure 2 is a view, partly in section, of a modified form of thermal bulb for use in a system according to this invention.

Referring first more particularly to Fig. 1, the numeral 11 indicates generally a pressure operator of the expansible-contractible bellows type which comprises a movable head or wall 12 and a fixed wall 13 interconnected by a bellows 14 sealingly secured at its ends to the walls, as by solder, to define the pressure or work chamber; the top wall 13 being attached to a support 15, and the bottom wall 12 having a stem 16 for connection to a device to be operated, such as a fluid-control valve or an electric switch.

The work chamber is fluidly connected by a capillary tube 17, secured in an opening through a boss 18 on the top of wall 13, to a thermal bulb 19 of conventional construction. In a lower enlargement of the opening through boss 18 is a filter 20, conveniently of the porous powdered-metal type.

The closed pressure system, which includes the bellows or work chamber and the interior of the thermal bulb and capillary tube, is charged or filled with the usual thermally expansive fluid. In a vapor-tension system that fluid may be such as dichlorodifluoromethane; and, for a solid liquid fill, substances such as toluene, monochlorobenzene, or ethyl ether may be employed. Other fluids obviously may be employed depending on the range of controlling temperature and other factors.

In the fluid in the bellows chamber is a large amount of solid matter having a low coefficient of thermal expansion. According to this invention, any material of that character, and preferably in finely divided form, may be employed.

However, the material which I have found to be particularly suitable is ordinary silica powder which when mixed with the usual thermally expansive liquids remains suspended therein and forms a mixture, indicated in Fig. 1 by the numeral 21, which flows freely in narrow spaces such as those between the convolutions of small bellows. Furthermore, silica is said to have the lowest coefficient of expansion by heat of any known substance. The amount of silica powder added to the liquid in the work chamber is preferably such that it displaces at least 50% of the liquid in the chamber when the movable wall is in its mean working position; the amount of liquid remaining being only sufficient to facilitate flow of the solid matter.

The filter 20, for preventing access of the silica or other solid matter to the interior of the thermal bulb, is essential only when the matter is in finely divided form. If it is desired to minimize the effect of ambient temperature in the capillary tube as well as in the work chamber, the filter is then mounted in the thermal bulb as indicated in Fig. 2. In that figure the capillary tube 17 is shown secured in an opening through the thickened end 22 of a thermal bulb 23; a filter 24, of the same kind as in Fig. 1, being provided in an enlargement of the capillary-tube opening. When a filter is provided at the thermal bulb the other filter 20, at the bellows, is omitted so that the mixture 21 extends throughout the capillary tube; bulb 23 containing only the liquid indicated at 25.

No spring for aiding return of the movable wall upon decrease of pressure in the work chamber, and which may be adjusted to determine the control setting, has been shown since such means are usually incorporated in the operated device.

While there has been shown in the drawing, by way of example, a bellows arrangement wherein the fluid is inside the bellows so that the same expands with increase of temperature and pressure in the system, it is obvious that the invention is equally applicable to systems which employ such as (1) a bellows arrangement of the kind wherein the pressure is applied to the outside of the bellows so that it contracts with increase of pressure, (2) a flexible diaphragm, or (3) a piston having a seal of the O-ring type.

The specific embodiment of my invention herein shown and described is therefore to be considered as merely illustrative and not as limiting the scope of the appended claims.

I claim as my invention:

1. In a thermostatic control system of the type which comprises means defining a work chamber having a wall movable in response to variation of pressure in the chamber; a thermal bulb, adapted to be subjected to the controlling temperature, in communication with said work chamber and forming therewith a closed system; and a solid fill of nonmetallic thermally expansive liquid in said closed system: the improvement consisting in that said work chamber contains, in addition to said liquid, a substantial amount of solid matter having a low coefficient of thermal expansion and in the form of particles of such fineness and character that they remain substantially suspended in the liquid; and filter means are provided for preventing access of the particles to the interior of said thermal bulb.

2. A thermostatic control system as defined in claim 1 wherein said solid matter is of an amount such that the amount of liquid in said work chamber is only sufficient to effect free flow of the particles in movements of said wall.

3. In a thermostatic control system of the type which comprises means, including an expansible-contractible bellows, defining a work chamber having a wall movable in response to variation of pressure in the chamber; a thermal bulb, adapted to be subjected to the controlling temperature, connected to said work chamber so as to form therewith a closed system; and a solid fill of non-metallic thermally expansive liquid in said closed system: the improvement consisting in that said work chamber contains, in addition to said liquid, a substantial amount of solid matter having a low coefficient of thermal expansion and in the form of particles of such fineness and character that they remain substantially suspended in the liquid and can flow freely in the convolutions of said bellows; and filter means are provided for preventing access of the particles to the interior of said thermal bulb.

4. A thermostatic control system as defined in claim 3 wherein said solid matter is of an amount such that the amount of liquid in said work chamber is only sufficient to facilitate flow of the particles in the movements of said wall.

References Cited in the file of this patent

UNITED STATES PATENTS

| 883,159 | Fournier | Mar. 29, 1908 |
| 1,998,818 | Newell | Apr. 23, 1935 |

FOREIGN PATENTS

| 11,798 | Great Britain | 1910 |
| 20,411 | Denmark | July 27, 1915 |
| 526,378 | France | June 30, 1921 |